Dec. 13, 1960  B. I. ULINSKI  2,964,332
AXLE FOR INDUSTRIAL TRUCK
Filed June 5, 1958  2 Sheets-Sheet 1
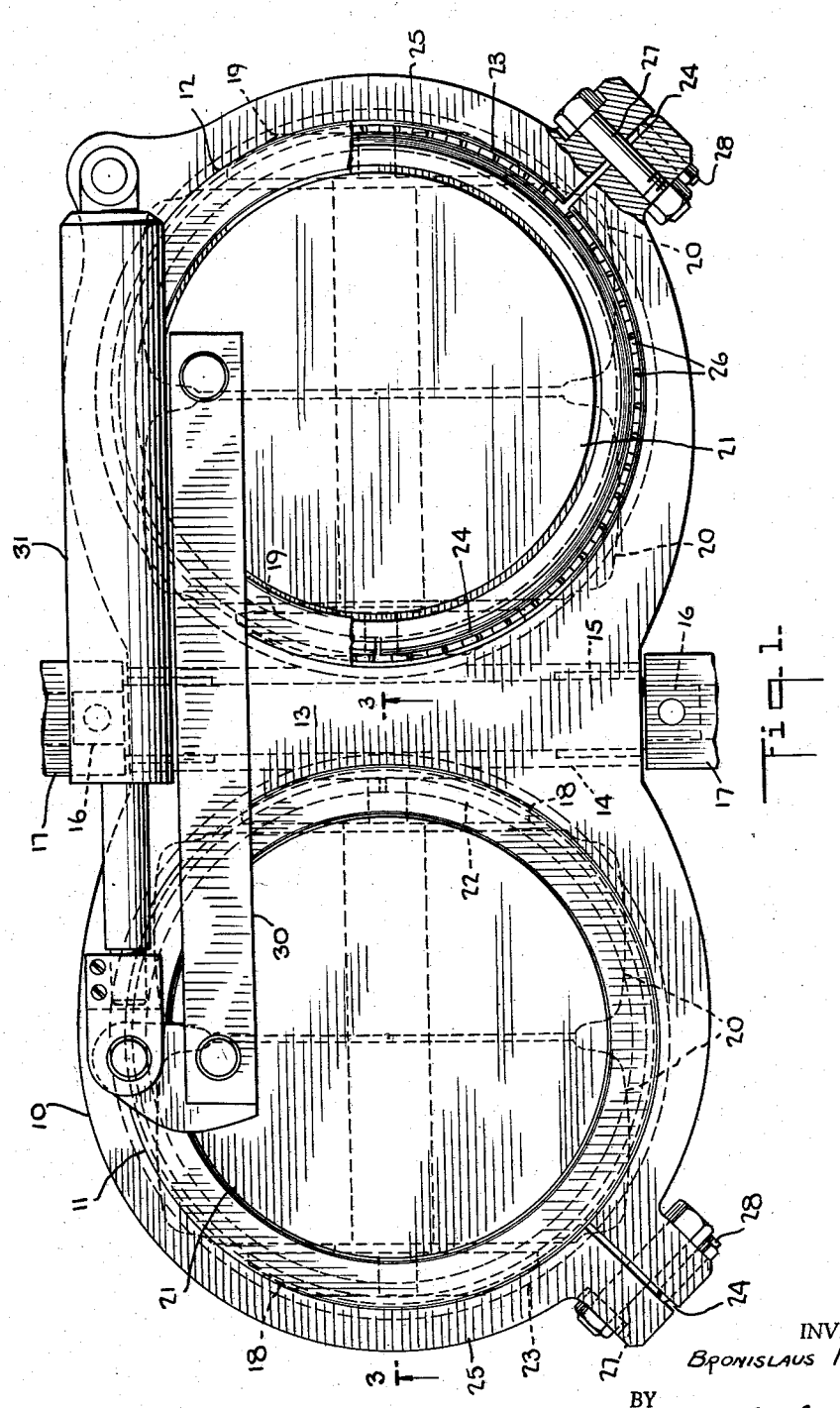
INVENTOR.
BRONISLAUS I. ULINSKI
BY
ATTORNEY

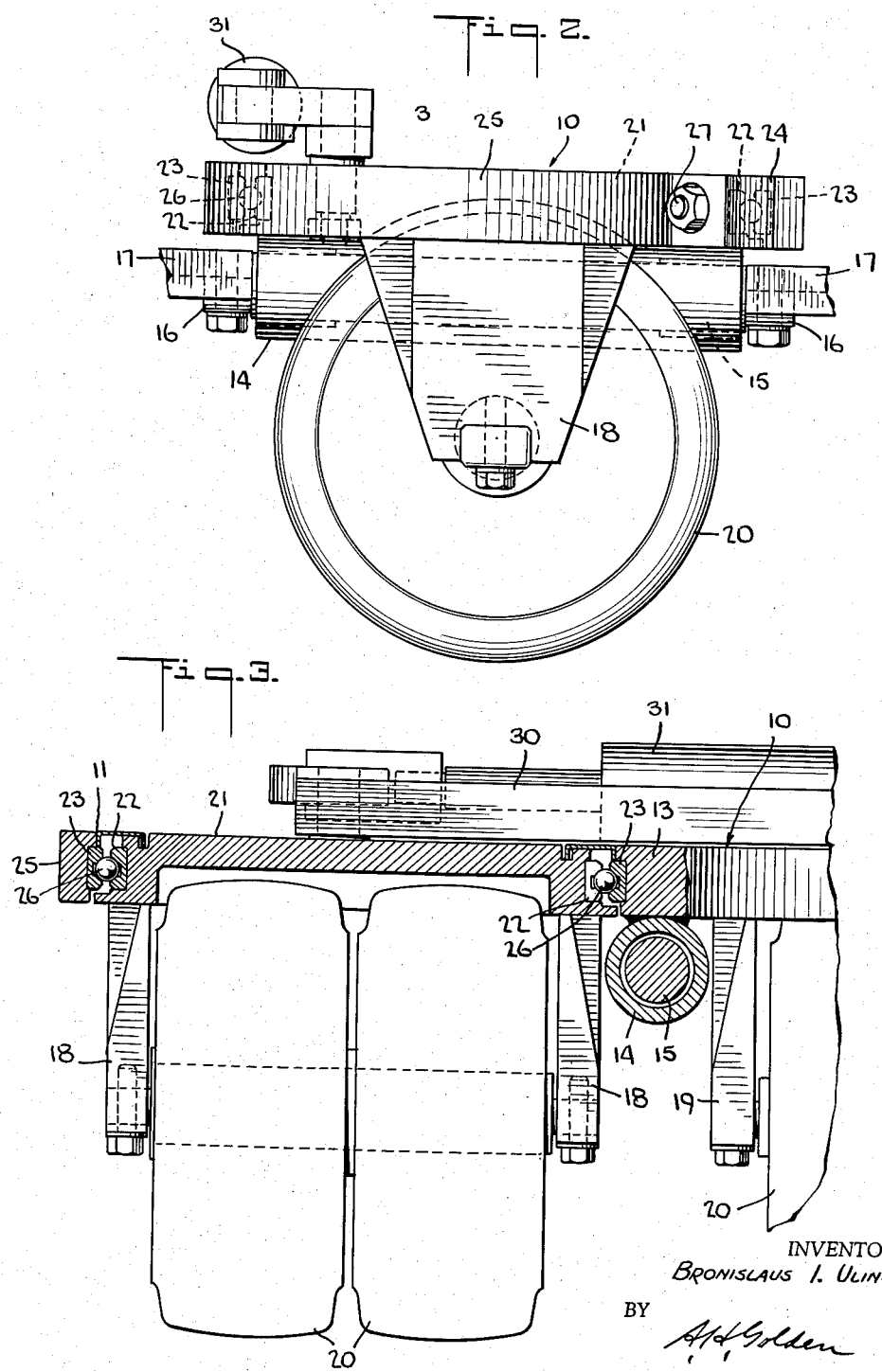

United States Patent Office 2,964,332
Patented Dec. 13, 1960

2,964,332

AXLE FOR INDUSTRIAL TRUCK

Bronislaus I. Ulinski, Flossmoor, Ill., assignor to The Yale and Towne Manufacturing Company, Stamford, Conn., a corporation of Connecticut Filed June 5, 1958, Ser. No. 740,023

2 Claims. (Cl. 280—111)

This invention relates to the mounting of wheels for steering rotation relatively to an industrial truck.

Those skilled in the art will appreciate that it is desirable to utilize an articulating or pivoting axle to support a pair of steering wheels relatively to an industrial truck, since that enables each steering wheel to accept its full share of the load when the truck moves over uneven ground. One construction of that type is shown in the patent to Framhein, No. 2,713,918, having a beam or axle that is mounted for transverse pivotal movement on the frame of an industrial truck, and turntables supporting the wheels on the beam or axle. That earlier construction is of considerable value because it allows each wheel to move vertically, while supporting each wheel independently for steering movement through a very wide angle. The exceedingly novel concept of my invention enables me to achieve the very desirable advantages of Framhein through the utilization of means that are inexpensive and relatively easy to assemble and to maintain.

In my invention, I support a pair of wheel yokes for steering rotation upon an axle that is merely a steel plate, together with means whereby each yoke will be assembled to the plate through a very simple procedure. Thus, I use as a part of each wheel yoke a simple one-piece turntable that I assemble to the plate through the insertion of bearings between the turntable and plate. Thereby I do not need to equip the turntable with portions that are movable or adjustable, to enable me to mount the turntable on the axle.

More particularly, I form the steel plate of my pivoted axle with an opening for each wheel yoke or turntable. A portion of the plate then extends between the two plate openings, and to that portion I secure a bearing on which the plate pivots relatively to the truck. I then form the plate with slots, whereby parts of the plate can move relatively to the portion of the plate that carries the bearing on which the plate pivots. That enables me to adjust the size of each of the plate openings independently, so that I can assemble ball bearings between each wheel yoke and the plate. Actually, the assembly of the ball bearings is somewhat like that described in my earlier application, Ser. No. 543,658, filed October 31, 1955, now Patent No. 2,842,216, but in that application the bearings are simply held in position through a split ring that is drawn about the bearings, after which the ring is clamped to a truck. Through the novel contribution that I have now made, I am able to assemble the bearings relatively to two openings in an axle, when the axle is equipped with a bearing on which it pivots.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a plan view showing my invention.

Fig. 2 is a side view.

Fig. 3 is a section on the line 3—3 in Fig. 1.

Referring now more particularly to the drawings, I indicate generally by the numeral 10 a steel plate that I utilize for the axle of my invention. The plate 10 resembles to some extent the beam or axle that is shown in the Framhein patent to which I have already referred. Thus, as shown in Fig. 1, I form the axle or plate 10 with two circular openings 11, 12, leaving between those openings a plate portion 13 that forms a part of the periphery of each opening 11, 12. Longitudinally on the plate portion 13 I secure bearing means that in my preferred construction include a bearing tube 14 welded to the portion 13. I assemble a shaft 15 in the bearing tube 14, that shaft having end portions 16 adapted to be bolted to portions 17 on the main frame of a truck, as is well shown in Fig. 2. It will be appreciated that the plate 10 thereby will be supported for transverse pivotal movement relatively to the truck.

I utilize a pair of wheel yokes 18, 19 for mounting wheels 20 relatively to the plate 10, each of those yokes including a turntable 21 that is arranged in one of the plate openings 11, 12. The details whereby the wheels 20 are supported on the yokes 18, 19 are not important to an understanding of my invention, but it is important to realize that my invention enables each of the turntables 21 to be merely a single integral part of its corresponding yoke. In the construction that I prefer, and that I show in the drawings, each turntable 21 is equipped with a split inner bearing race 22, but that is not essential since the inner race may simply be formed on the outer periphery of the turntable. Also, I show an outer bearing race 23 in each of the plate openings 11, 12, but it will be understood that those races may be formed integrally on the plate.

I shall now call attention to the fact that I form the plate 10 with slots 24, Fig. 1, that extend from the outer periphery of the plate to the openings 11, 12. To appreciate the operation of those slots, it is necessary to understand that each slot will enable a part 25 of the plate 10 around each of the openings 11, 12 to flex somewhat relatively to the plate portion 13 that carries the bearing tube 14. Each slot 24 naturally will extend through the outer bearing race 23 when a separate race is utilized. Thereby I am able to adjust the size of each plate opening 11, 12 so that I can insert ball bearings 26 between each turntable 21 and its corresponding opening 11, 12. Each of the slots 24 has a bolt 27 that will be utilized to draw the surfaces of the slot toward one another, in order to secure the ball bearings 26 in place. I prefer to utilize also adjusting screws 28 that will enable me more readily to achieve a precise adjustment of each slot 24 and opening 11, 12. I believe that the operation of the bolts 27 and screws 28 will be well understood, since they act in substantially the same way as do those shown in my earlier application. Thus, the ball bearings 26 will be held assembled between the turntables 21 and the plate 10, and the bearings 26 then will hold the turntables 21 against vertical movement and for rotation relatively to the plate.

Through the construction that I have described, it is possible to mount steering wheels through very simple means on an axle, despite the fact that the axle is equipped with a bearing on which it articulates. Actually, those means may include a bearing arrangement like that shown in my earlier application, enabling each wheel to be mounted on a turntable that is merely a single integral part of a corresponding wheel yoke. The wheels then will be independently supported for steering rotation through an angle that is very large.

I do, incidentally, show my novel articulating axle equipped with a tie rod 30 extending between the turntables 21, and a hydraulic ram 31 that acts between the axle 10 and one turntable 21 whereby to steer the wheels. However, the particular steering means are not important, since it is conceivable that other means may be utilized to impart steering rotation to the wheels.

I believe that the construction and operation of my exceedingly novel axle will now be understood, and that the very considerable value of my invention will be fully appreciated by those persons skilled in the art.

I now claim:

1. In an axle of the class described, a steel plate having a pair of circular openings, said plate including a medial portion between said openings and forming a part of the periphery of each opening, and further portions integral with the medial plate portion and extending from said medial portion in opposed directions to form further parts of the periphery of each opening, each of said medial and further portions of the plate being relatively wide in cross section so that the plate will be rigid for a considerable distance around both openings, said plate including also a relatively narrow part completing the periphery of each opening, slots leading from the plate openings to the outer edge of the plate and enabling said narrow parts to move relatively to the rigid portions of the plate, means for so moving said narrow parts whereby to adjust the size of each plate opening, a wheel yoke arranged in each of said openings, ball bearings assembled between said wheel yokes and the surfaces of the corresponding openings to hold each yoke for rotation relatively to the plate and against vertical movement relatively thereto, said ball bearings being held assembled through the adjustment of the size of the plate openings after the bearings are placed in assembled position, and bearing means on said medial portion of the plate and through which the plate and wheel yokes are mounted for transverse pivotal movement.

2. In an axle of the class described, a steel plate having a pair of circular openings, said plate including a medial portion between said openings and forming a part of the periphery of each opening, a bearing tube integrally secured to said medial portion of the plate and through which said plate is mounted for transverse pivotal movement, further portions of the plate extending from said medial plate portion in opposed directions to form further parts of the periphery of each opening, each of said medial and further portions of the plate being relatively wide in cross section so that the plate will be rigid relatively to the bearing tube for a considerable distance around both plate openings, said plate including also a relatively narrow part completing the periphery of each opening, each narrow part being formed with a slot extending therethrough whereby to be somewhat flexible, means for compressing said slots to flex each narrow part of the plate whereby to adjust the size of each plate opening, a wheel yoke arranged in each of said openings, and ball bearings assembled between said wheel yokes and the surfaces of the corresponding openings to hold each yoke for rotation relatively to the plate and against vertical movement relatively thereto, said ball bearings being held assembled through the compressing of said slots after the bearings are placed in assembled position.

References Cited in the file of this patent

UNITED STATES PATENTS

| | | |
|---|---|---|
| 2,713,918 | Framheim | July 26, 1955 |
| 2,842,216 | Ulinski | July 8, 1958 |